（12）United States Patent
Park

(10) Patent No.: US 8,643,229 B2
(45) Date of Patent: Feb. 4, 2014

(54) LINEAR VIBRATION DEVICE

(75) Inventor: Youngil Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 325 days.

(21) Appl. No.: 13/099,830

(22) Filed: May 3, 2011

(65) Prior Publication Data

US 2011/0280433 A1  Nov. 17, 2011

(30) Foreign Application Priority Data

May 14, 2010 (KR) ........................ 10-2010-0045485

(51) Int. Cl.
*H02K 33/00* (2006.01)

(52) U.S. Cl.
USPC .............................................. 310/15; 310/25

(58) Field of Classification Search
USPC .................. 310/81, 14, 15, 17, 20, 25, 36
See application file for complete search history.

(56) References Cited

U.S. PATENT DOCUMENTS

| | | | | |
|---|---|---|---|---|
| 4,169,234 A | * | 9/1979 | Yonkers | ........................... 310/29 |
| 7,619,498 B2 | * | 11/2009 | Miura | ........................... 335/222 |
| 8,384,259 B2 | * | 2/2013 | Choi et al. | ...................... 310/81 |
| 8,400,027 B2 | * | 3/2013 | Dong et al. | ..................... 310/25 |

* cited by examiner

*Primary Examiner* — Dang Le
(74) *Attorney, Agent, or Firm* — Saliwanchik, Lloyd & Eisenschenk

(57) ABSTRACT

Disclosed is a linear vibration device, the linear vibration device including: a case formed with a storage space; a vibrator including a cylindrical back yoke accommodated in the storage space, a magnet mounted on the back yoke, a leaf spring coupled to the back yoke and a weight coupled to the back yoke; and a coil block accommodated in the case to face the magnet, wherein one lateral end of the leaf spring is coupled to the case, and the other lateral end of the leaf spring facing the one lateral end is coupled to the back yoke.

20 Claims, 3 Drawing Sheets

LINEAR VIBRATION DEVICE

CROSS-REFERENCE TO RELATED APPLICATION

This application claims the benefit under 35 U.S.C. §119 of Korean Patent Application No. 10-2010-0045485, filed May 14, 2010, which is hereby incorporated by reference in its entirety.

BACKGROUND OF THE DISCLOSURE

1. Field of the Invention

The present disclosure relates to a linear vibration device.

2. Description of Related Art

Generally, a conventional linear vibration device (or linear vibrator, hereinafter referred to as linear vibration device) includes a pipe-shaped coil arranged on a floor of a case, a spring arranged on an upper surface of the case, a weight secured at the spring and a magnet secured at the weight to reciprocate to a vertical direction in the coil.

The magnet in the conventional linear vibration device vertically reciprocates relative to the case inside the coil, and a linear vibration device is manufactured with heavy thickness and large size due to the spring for vertically reciprocating the magnet, such that a problem arises of making an ultra small-sized electronic device such as a mobile terminal voluminous, if the linear vibration device is employed in the mobile terminal.

BRIEF SUMMARY

The present disclosure is to provide a linear vibration device with improved structure by making the linear vibration device vibrate horizontally to thereby reduce thickness and size, and to inhibit durability from decreasing due to broken leaf spring in the course of horizontal vibration.

Technical subjects to be solved by the present disclosure are not restricted to the above-mentioned description, and any other technical problems not mentioned so far will be clearly appreciated from the following description by those skilled in the art.

In one general aspect of the present disclosure, there is provided a linear vibration device, the linear vibration device comprising: a case formed with a storage space; a vibrator including a cylindrical back yoke accommodated in the storage space, a magnet mounted on the back yoke, a leaf spring coupled to the back yoke and a weight coupled to the back yoke; and a coil block accommodated in the case to face the magnet, wherein one lateral end of the leaf spring is coupled to the case, and the other lateral end of the leaf spring facing the one lateral end is coupled to the back yoke.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Figure 1:
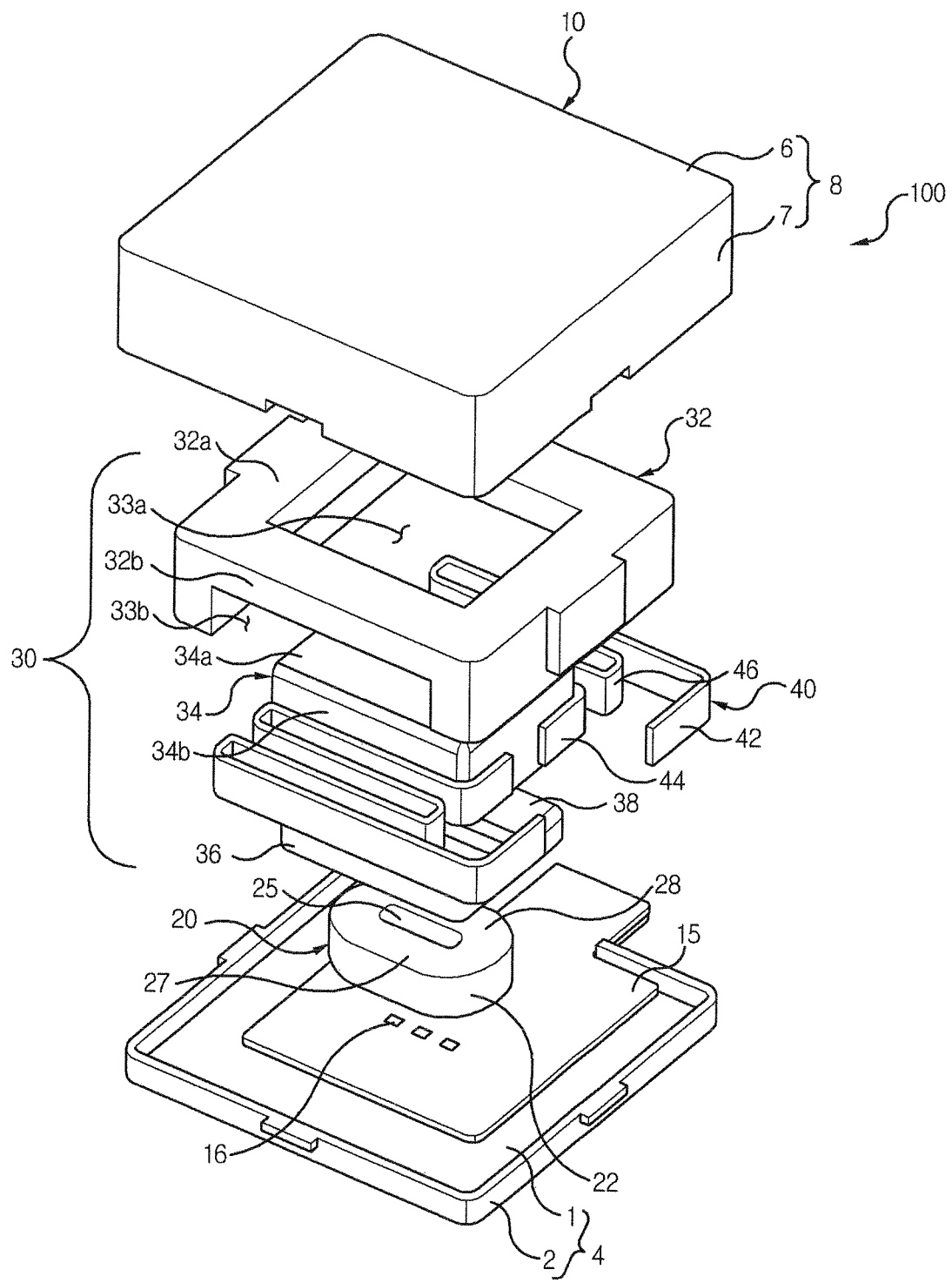
FIG. 1 is an exploded perspective view of a linear vibration device according to an exemplary embodiment of the present disclosure.

Hereinafter, an exemplary embodiment of the present disclosure is described in detail with reference to the accompanying drawings. In the drawings, sizes or shapes of constituent elements may be exaggerated for clarity and convenience.

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

Now, construction and operation of the linear vibration device according to the present disclosure will be described in detail.

Figure 2:
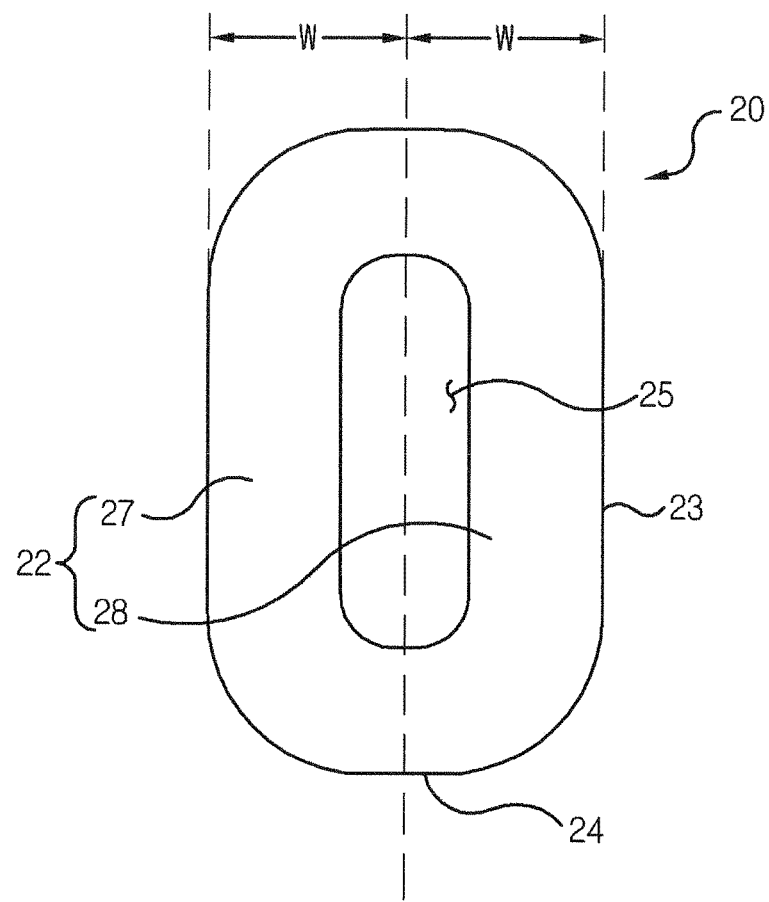
FIG. 2 is a plan view illustrating a coil block of FIG. 1.
Figure 3:
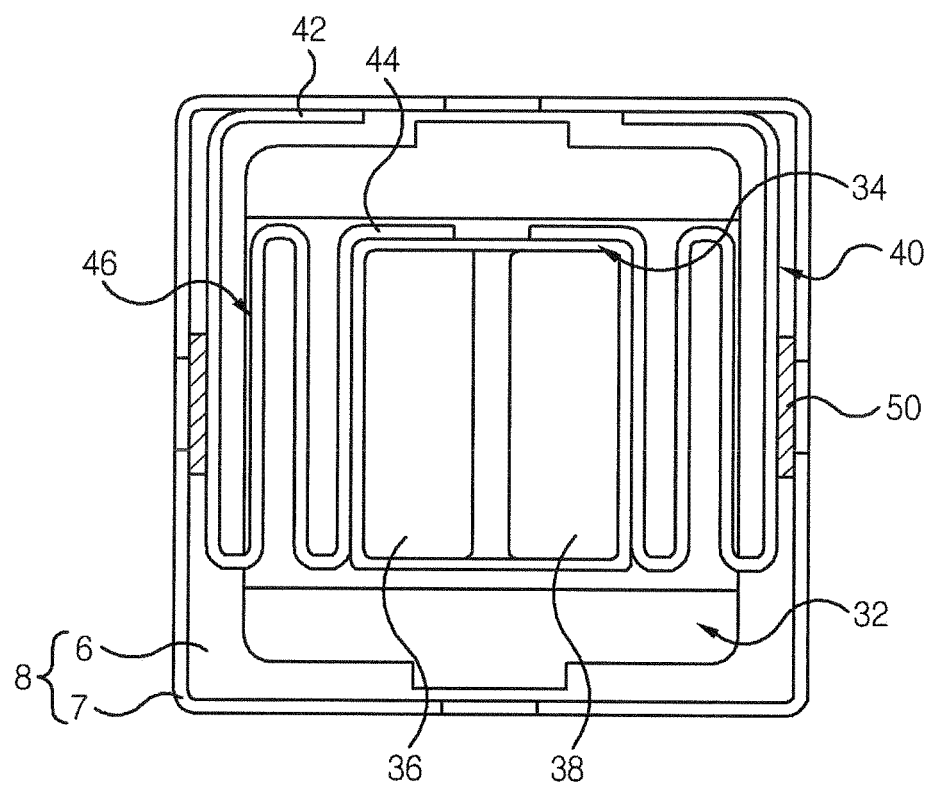
FIG. 3 is a plane view illustrating an upper case, a back yoke, a magnet and a leaf spring of the linear vibration device of FIG. 1.

FIG. 1 is an exploded perspective view of a linear vibration device according to an exemplary embodiment of the present disclosure, FIG. 2 is a plane view illustrating a coil block of FIG. 1, and FIG. 3 is a plane view illustrating an upper case, a back yoke, a magnet and a leaf spring of the linear vibration device of FIG. 1.

Referring to FIGS. 1, 2 and 3, a linear vibration device (100) includes a case (10), a stator (20), a vibration device (30) and a spring. The linear vibration device (100) may further include a shock absorbing member (50). The shock absorbing member (50) may be interposed between an inner lateral surface of the case (10) and the leaf spring (40).

The case (10) includes a lower case (4) and an upper case (8). The lower case (4) includes a floor plate (1) and a lateral surface plate (2). The floor plate (1) of the lower case (4) may take the shape of a square plate, and the lateral surface plate (2) may be bent from an edge of the floor plate (1) to one side to allow a storage space to be formed in the lower case (4), for example. The lateral surface plate (2) of the lower case (4) may be formed with a first height.

The upper case (8) includes a floor plate (6) and a lateral surface plate (7). The floor plate (6) of the upper case (8) faces the floor plate (1) of the lower case (4), and the lateral surface plate (7) of the upper case (8) is bent from the floor plate (6) to the lateral surface plate (2) of the lower case (4). The lateral surface plate (7) of the upper case (8) may be formed with a second height higher than the first height.

In the exemplary embodiment of the present disclosure, the lateral surface plate (2) of the lower case (4) and the lateral surface plate (7) of the upper case (8) are mutually coupled.

Referring to FIGS. 1 and 2, the stator (20) is arranged on the floor plate (1) of the lower case (4), for example. In the exemplary embodiment of the present disclosure, the stator (20) includes a coil block (22) by winding a coil to a direction parallel with the floor plate (1) of the lower case (4).

The coil block (22) is arranged on an upper surface of the floor plate (1) of the lower case (4), the coil block (22) is formed by winding a coil to a direction parallel with the floor plate (1) of the lower case (4), and the coil block (22) is formed with an opening (25) and takes the shape of a cylinder.

Referring to FIG. 2, the coil block (22) according to an exemplary embodiment of the present disclosure takes the shape of a rectangle having a long side (23) and a short side (24), where the opening (25) of the rectangular cylindrical coil block (22) takes the shape of a rectangle due to the shape of the coil block (22).

The linear vibration device according to the exemplary embodiment of the present disclosure has an advantageous effect in that the coil block (22) takes the shape of a rectangle and is centrally formed with the rectangular opening (25) to further increase a magnetic field generated by the coil block (22) and a suction force and a repulsive force generated from a magnetic field generated by the magnet (described later).

The linear vibration device according to the exemplary embodiment of the present disclosure has another advantageous effect in that the coil block (22) takes the shape of a rectangle to further increase an action area of the coil block and the magnet (described later) over a case where the coil block (22) takes the cylindrical shape, whereby responsiveness of the magnets can be further enhanced.

The coil block (22) is divided into a first coil unit (27) and a second coil unit (28) based on the opening (25).

Referring to FIG. 2, the first coil unit (27) is arranged at a left hand side of the opening (25), and the second coil unit (28) is arranged at the right hand side of the opening (25) when viewed from a plane. In the present exemplary embodiment, each of the first and second coil units (27, 28) is formed with a designated width (W).

Now, referring to FIG. 1 again, the linear vibration device includes a circuit substrate (15) interposed between the coil block (22) formed by winding a coil and the floor plate (1) of the lower case (4), where the circuit substrate (15) includes a connection terminal (16) electrically connected to the coil of the coil block (22). The circuit substrate (15) in the present exemplary embodiment may be a flexible circuit substrate with a thin thickness, and part of the flexible circuit substrate is extracted to outside to be electrically connected to an outside device.

The vibrator (30) includes a weight (32), a back yoke (34) and first and second magnets (36, 38).

The weight (32) includes an upper plate (32a) and a lateral surface plate (32b). The upper plate (32a) and the lateral surface plate (32b) of the weight (32) in the present exemplary embodiment are integrally formed, where the lateral surface plate (32b) is perpendicularly formed relative to the upper plate (32a).

The upper plate (32a) of the weight (32) is formed with a first square-shaped opening (33a), and the lateral surface plate (32b) of the weight (32) is formed with a second opening (33b) when viewed from a plane. The back yoke (34, described later) and the weight (32) are coupled by the first opening (33a) and the second opening (33b) inhibits the interference between the leaf spring (40, described later) and the weight (32).

The back yoke (34) takes the shape of a bottom-opened hexagon, for example. To be more specific, the back yoke (34) includes an upper plate (34a) and a lateral plate (34b).

The upper plate (34a) of the back yoke (34) is arranged in parallel with the floor plate (6) of the upper case (8), and is formed by an area coupled to the first opening (33a) formed at the upper plate (32a) of the weight (32). The upper plate (34a) of the back yoke (34) is formed in the shape of a square plate when viewed from a plane.

The lateral plate (34b) of the back yoke (34) may be bent from or coupled to an edge of the upper plate (34a). The back yoke (34) is formed therein with a space for accommodating and securing magnets (described later) by the upper plate (34a) and the lateral plate (34b) of the back yoke (34).

Each of the first and second magnets (36, 38) takes the shape of a rectangle, and is coupled to an inner lateral surface of the back yoke (34). The first and second magnets (36, 38) according to the exemplary embodiment of the present disclosure may be coupled to an inner lateral surface of the lateral plate (34b) of the back yoke (34), or to an inner lateral surface of the upper plate (34a) of the back yoke (34).

The first magnet (36) is arranged at a position facing the first coil unit (27) of the coil block (22), and the second magnet (38) is arranged at a position facing the second coil unit (28) of the coil block (22).

A distal end of the first magnet (26) facing the first coil unit (27) is formed with a first magnetic pole, and a distal end of the second magnet (28) facing the second coil unit (28) is formed with a second magnetic pole opposite to the first magnetic pole. The first magnetic pole may be an N pole and the second magnetic pole may be an S pole, for example.

In a case a current flows in the coil block (22) formed by winding the coil, the first and second magnets (36, 38) are applied with a force acting to a left hand direction or a right hand direction by a magnetic field generated by the coil block (22) and a magnetic field generated by the first and second magnets (36, 38), whereby the first and second magnets (36, 38) are vibrated on the coil block (22) to a direction parallel to the floor plate (1) of the lower case (4).

The leaf spring (40) is coupled to the lateral plate (34b) of the back yoke (34). To be more specific, the leaf spring (40) is coupled to either lateral plate (34b) facing the back (34). Each leaf spring (40) includes a first coupling unit (42), a second coupling unit (44) and an elastic unit (46). Each leaf spring (40) is formed by a band-shaped metal plate, for example.

To be more specific, the first coupling unit (42) is defined by a portion coupled to an inner lateral surface of the lateral surface plate (7) of the upper case (8) in the case (10), and the second coupling unit (44) is defined by the lateral plate (34b) of the back yoke (34).

The first coupling unit (42) and the lateral surface plate (7) of the upper case (8) may be coupled by an adhesive, a coupling screw or by welding, for example. The second coupling unit (44) and the lateral plate (34b) of the back yoke (34) may be also coupled by an adhesive, a coupling screw or by welding, for example.

The first coupling unit (42) is integrally formed with one distal end of the elastic unit (46), and bent perpendicularly bent relative to the elastic unit (46). The second coupling unit (44) is integrally formed with the other distal end facing the one distal end of the elastic unit (46), and bent perpendicularly bent relative to the elastic unit (46).

The elastic unit (46) is integrally formed with first and second coupling units (42, 44), and bent to a clockwise direction or a counterclockwise direction at least twice or more times.

The elastic unit (46) is bent in a zigzag manner. The one distal end of the elastic unit (46) is formed with the first coupling unit (46) and the other distal end facing the one distal end of one distal end of the elastic unit (46) is formed with the second coupling unit (44), whereby length of the leaf spring (40) can be increased within a limited size of the case

(10) to further enhance the elasticity and to inhibit the elastic unit (40) from being cut by the external shock.

Meanwhile, although the exemplary embodiment of the present invention has described that the leaf spring (40) is directly coupled to the case (10), the case (10) and the leaf spring (40) may be indirectly coupled by a fixture member interposed between the case (10) and the leaf spring (40). The fixture member may be a double-sided tape, a clip and the like, for example.

As apparent from the foregoing, the linear vibration device according to the present disclosure has an industrial adaptability in that a coil block is formed between a lower case and an upper case, a magnet fixed by a back yoke is arranged on an upper surface of the back yoke, the magnet is made to reciprocate on the coil block in parallel with a floor plate of the lower case, and the back yoke and part of a leaf spring coupled to the upper case are bent in the zigzag manner to inhibit the leaf spring from being cut by an external shock, and to increase the length of the leaf spring whereby elasticity can be enhanced.

The above-mentioned linear vibration device according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A linear vibration device, the linear vibration device comprising:
    a case formed with a storage space;
    a vibrator including a back yoke accommodated in the storage space, a magnet mounted on the back yoke, a leaf spring coupled to the back yoke and a weight coupled to the back yoke; and
    a coil block accommodated in the case to face the magnet, wherein one lateral end of the leaf spring is coupled to the case, and the other lateral end of the leaf spring facing the one lateral end is coupled to the back yoke, and
    wherein the other lateral end of the leaf spring passes through a side of the weight to be directly coupled to the back yoke.

2. The linear vibration device of claim 1, wherein the case includes a lower case and an upper case coupled to the lower case to form the storage space.

3. The linear vibration device of claim 1, wherein the leaf spring includes a first coupling unit coupled to the case, a second coupling unit coupled to the back yoke and an elastic unit formed between the first and second coupling units.

4. The linear vibration device of claim 3, wherein the first coupling unit is bent to be coupled to the case, and the second coupling unit is bent to be coupled to the back yoke.

5. The linear vibration device of claim 3, wherein the elastic unit is bent in a zigzag manner.

6. The linear vibration device of claim 3, wherein each of the first coupling, the elastic unit and the second coupling unit is formed by bending a band-shaped metal plate.

7. The linear vibration device of claim 3, wherein the first coupling unit and the case, and the second coupling unit and the back yoke are mutually coupled by an adhesive, a coupling screw or by way of welding.

8. The linear vibration device of claim 3, wherein the elastic unit is bent in a zigzag manner and arranged in parallel with a lateral surface of the back yoke.

9. The linear vibration device of claim 1, wherein the magnet includes a first magnet in which a first magnetic pole faces a part of the coil block, a second magnet in which a second magnetic pole facing the first magnetic pole faces a remaining part of the coil block.

10. The linear vibration device of claim 9, wherein the coil block includes an opening, the first magnet is arranged on a first coil unit corresponding to one lateral surface of the opening, and a second magnet is arranged on a second coil unit corresponding to the other lateral surface facing the one lateral surface of the opening.

11. The linear vibration device of claim 10, wherein the first and second magnets vibrate to a direction parallel to a floor plate of the case on the coil block.

12. The linear vibration device of claim 1, wherein each of the coil block and the opening at the coil block takes the shape of a rectangle.

13. The linear vibration device of claim 1, further comprising a circuit substrate interposed between the lower case and the coil block to be electrically connected to the coil block.

14. The linear vibration device of claim 13, wherein the circuit substrate further includes connection terminals electrically connected to distal ends of coil forming the coil block.

15. The linear vibration device of claim 1, further comprising a shock absorbing member interposed between the weight and an inner lateral surface of the case facing the weight.

16. The linear vibration device of claim 1, wherein the weight includes an upper surface and a lateral surface connected to the upper surface, wherein the upper surface of the weight is formed with a first opening coupled to the back yoke, and the lateral surface is formed with a second opening for inhibiting interference with the elastic unit of the leaf spring.

17. The linear vibration device of claim 1, wherein the leaf spring is symmetrically formed in a pair based on the back yoke in the case.

18. The linear vibration device of claim 1, wherein the magnet is arranged on an inner lateral surface of the back yoke, and the weight is arranged on a peripheral surface facing the inner lateral surface of the back yoke.

19. The linear vibration device of claim 1, further comprising a fixation member interposed between the case and the leaf spring for securing the leaf spring to the case.

20. The linear vibration device of claim 19, wherein the fixation member includes a double-sided tape or a clip.

* * * * *